US006111821A

United States Patent [19]

Bach

[11] Patent Number: 6,111,821

[45] Date of Patent: Aug. 29, 2000

[54] TRANSPARENT AND SCRATCHPROOF WATCH CRYSTAL AND WATCH CASE FITTED WITH SUCH A CRYSTAL

[75] Inventor: Michael Bach, Biel, Switzerland

[73] Assignee: Montres Rado S.A., Lengau, Switzerland

[21] Appl. No.: 09/007,042

[22] Filed: Jan. 14, 1998

[30] Foreign Application Priority Data

Jan. 15, 1997 [CH] Switzerland ............................ 0067/97

[51] Int. Cl.$^{7}$ ........................... G04B 37/00; G04B 39/00; B01J 3/06; C01B 31/06

[52] U.S. Cl. ........................... 368/280; 368/296; 423/446

[58] Field of Search .................................... 368/276, 280, 368/294–296; 423/446; 427/249, 255.7

[56] References Cited

U.S. PATENT DOCUMENTS 3,931,704 1/1976 Tominaga et al. .
4,002,020 1/1977 Klingenberg ............................ 368/292
4,198,811 4/1980 Ratajski ................................. 368/292
4,561,783 12/1985 Lederrey ................................ 368/296

FOREIGN PATENT DOCUMENTS 199207 10/1986 European Pat. Off. .

OTHER PUBLICATIONS

Patent Abstracts Of Japan, vol. 6, No. 135 (C–115), Jul. 22, 982 & JP 57 061644 A (Seiko Epson Corp.) Apr. 14, 1982.

*Primary Examiner*—Vit Miska
*Attorney, Agent, or Firm*—Sughrue, Mion, Zinn, Macpeak & Seas, PLLC

[57] ABSTRACT

A transparent and scratchproof watch crystal, characterized in that it is made of polycrystalline diamond. The invention also concerns a watch case fitted with such a watch crystal.

9 Claims, 2 Drawing Sheets

TRANSPARENT AND SCRATCHPROOF WATCH CRYSTAL AND WATCH CASE FITTED WITH SUCH A CRYSTAL

BACKGROUND OF THE INVENTION

The present invention concerns a scratchproof and transparent watch crystal, and in particular a watch crystal having a low cost price independently of the complexity of its shape, for example flat or spherical, while having a very high hardness, of the order of 10,000 Vickers.

The present invention also concerns a watch case fitted with such a crystal.

Watch crystals for the protection of dials and hands or suchlike are most often made either of a synthetic material or a mineral glass because of their relatively low cost price. The respective hardness of these categories of materials of course determines the scratch resistance of the crystals. In order to clarify, a watch crystal made of synthetic materials such as Plexiglas has a Vickers hardness of approximately 100 and natural or mineral glass has a Vickers hardness of approximately 900. Experience has shown that crystals made in these two categories of materials have poor resistance to scratches by certain very hard agents such as the silica contained in dust, marble or even the sand constantly present in our environment, even if mineral glass resists such attacks better than synthetic materials. There therefore results a relatively rapid alteration in the aesthetic appearance of these types of watch crystals or back covers by scratches.

In order to avoid these drawbacks, synthetic sapphire or corundum have been used for manufacturing watch crystals. These crystals are disclosed for example respectively in Swiss Patent No 632 891 and in French Patent No 1 238 069. These crystals resist attacks from external agents very well but have however the major drawback of being long, complex and laborious to manufacture and having a very high cost price, which considerably limit their use on a very large scale. By way of illustration, the electric energy requirements alone represent 80% of the manufacturing cost of the sapphire "pears" (cylindrical rods) from which are cut the plates which, after numerous subsequent machining operations, will form these watch crystals. Moreover, an average sized factory for manufacturing sapphire "pears" consumes annually as much electricity as a town of approximately 50,000 inhabitants.

It is thus easily understood, given current increasing energy saving concerns, the necessity of finding an alternative, and in particular a more economical, solution to the use of synthetic sapphire for making watch crystals having high scratch resistance and intended to be used in a wide range of watches.

Moreover, the production of these crystals mainly during the machining stage of the finished product from these "pears" results in significant raw material wastage.

SUMMARY OF THE INVENTION

The applicant has noted during study of new solutions that the application of polycrystalline diamond in the form of thin films, in particular obtained via chemical vapour deposition onto a substrate, to the making of watch crystals is particularly advantageous as the crystals thereby made perfectly fulfil the requirements necessary for making scratchproof watch crystals both from the economical point of view and from the point of view of their mechanical properties and their transparency.

The present invention thus precisely concerns a transparent and scratchproof watch crystal, characterised in that it is made of polycrystalline diamond.

Consequently, the complicated and expensive manufacture of synthetic sapphire, and the laborious and equally expensive transformation thereof into watch crystals are replaced by a simple chemical vapour deposition operation onto a substrate having the shape of the crystal which one wishes to obtain, said deposition being followed by a polishing operation.

It will be noted moreover that the hardness of the watch crystals according to the invention is of the order of 10,000 Vickers which makes them virtually scratchproof. The polycrystalline diamond crystals of the invention also have the advantage of having excellent chemical resistance properties.

Another significant advantage of the selection of diamond for manufacturing watch crystals is that, unlike synthetic sapphire, it is polycrystalline which gives it isotropic properties. If one were to envisage sintering sapphire powder, the part obtained would not be transparent because of the anisotropy of the relative optical properties of particles of sapphire. Such a problem does not exist with diamond manufactured via chemical vapour deposition.

The present invention also concerns a watch case including a middle part and a back cover, characterised in that it further includes a crystal which is formed of polycrystalline diamond.

Other features and advantages of the present invention will appear more clearly upon reading the following description of embodiment examples, said description being made by way of non limiting example and with reference to the annexed drawings, in which

DESCRIPTION OF PREFERRED EMBODIMENTS

Figure 1:
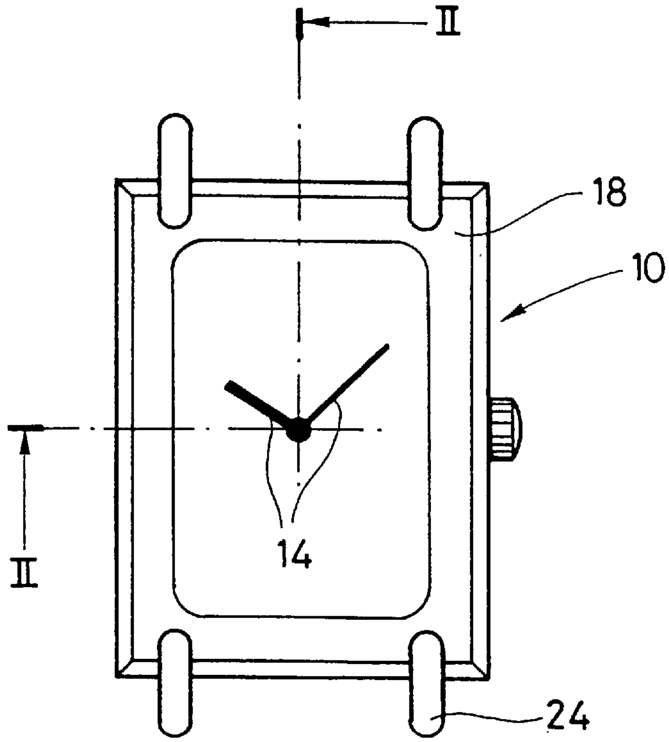
FIGS. 1 and 2 show a watch fitted with a scratchproof and transparent crystal according to the invention in plane view and in cross-section along the line II—II respectively.
Figure 2:
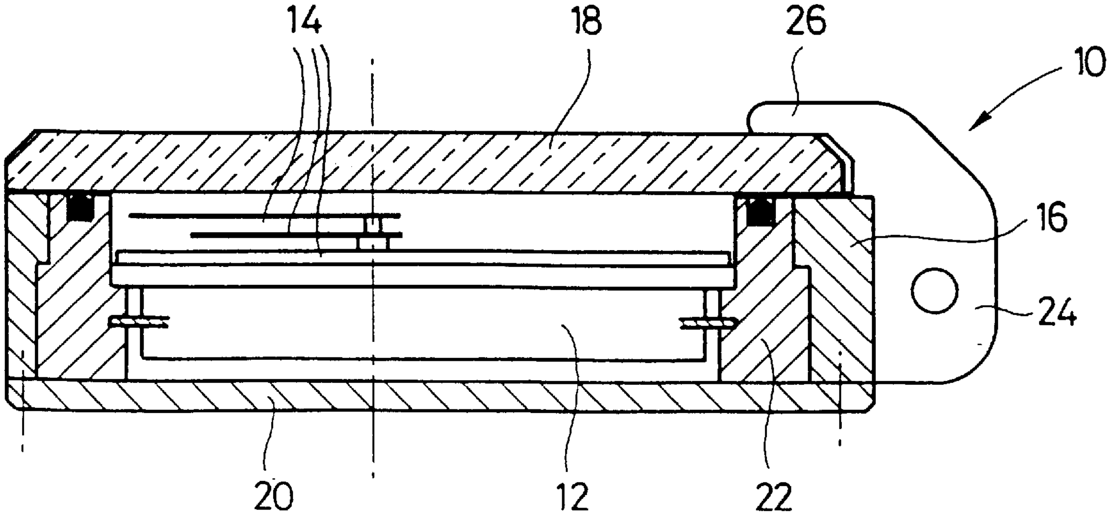

The watch shown in FIGS. 1 and 2 includes a case 10, a movement 12 and display means 14, including in this case hands and a dial. Case 10 includes a middle part 16, a first and a second element for closing the case, respectively a crystal 18 and a back cover 20, and a casing ring 22. Middle part 16 is provided with four horns 24 which extend above the body of the middle part and form claws 26 defining with the body of the middle part a slide bar inside which is housed crystal 18. Back cover 20 is fixed to middle part 16 via screws which are not shown in the drawing. It also abuts against casing ring 22. This casing ring extends over the entire height of middle part 16 and it abuts against crystal 18. Thus, when back cover 20 is fixed via screws, casing ring 22 exerts pressure on crystal 18 which abuts against claws 26. Since this construction is well known to the man skilled in the art, it is futile to describe it in a more explicit manner.

According to the invention, crystal 18 is a practically scratchproof element made of polycrystalline diamond. Crystal 18 may be obtained in the following manner. Firstly a graphite substrate is prepared including an upper surface having the negative shape of the crystal which one wishes to obtain. This negative shape is flat in the case of crystal 18 but may of course not be flat, for example partially cylindrical, partially spherical, or a combination of these shapes. The upper face of the substrate is polished then coated with a thin film of silicon carbide (SiC). A film of polycrystalline diamond is then deposited on the SiC film via chemical vapour deposition. During this deposition operation a film of polycrystalline diamond grows at the surface of the SiC to the desired thickness.

Once the desired thickness is reached, the polycrystalline diamond film intended to form crystal 18 is then polished and, if necessary, given its final dimensions to form a watch crystal such as crystal 18. This step for giving the final dimensions of the crystal is achieved for example by laser machining.

The polycrystalline diamond film is finally separated from the substrate, for example by chemical removal of the substrate.

The crystal thereby obtained is of course completely transparent in the visible spectrum after polishing and thus protects the display means while enabling them to be read.

The measures effected have given hardness results of the order of 10,000 Vickers. This hardness is approximately four times greater than that of sapphire so that the watch fitted with crystal 18 according to the invention is particularly well protected against external attacks and in particular against scratches which could only be caused by an object which itself has diamond portions.

The thickness of the watch crystal according to the invention is a function of the dimension of the desired crystal and the effect to be obtained. It will generally be between 0.5 and 2 mm.

A process allowing a crystal according to the invention such as crystal 18 to be obtained is described in more detail in European Patent Application EP-A-0 693 573 corresponding to U.S. Pat. No. 5,527,559 which is incorporated here by reference. It is to be understood that any other process allowing plates or films made of polycrystalline diamond to be made may be envisaged.

Figure 3:
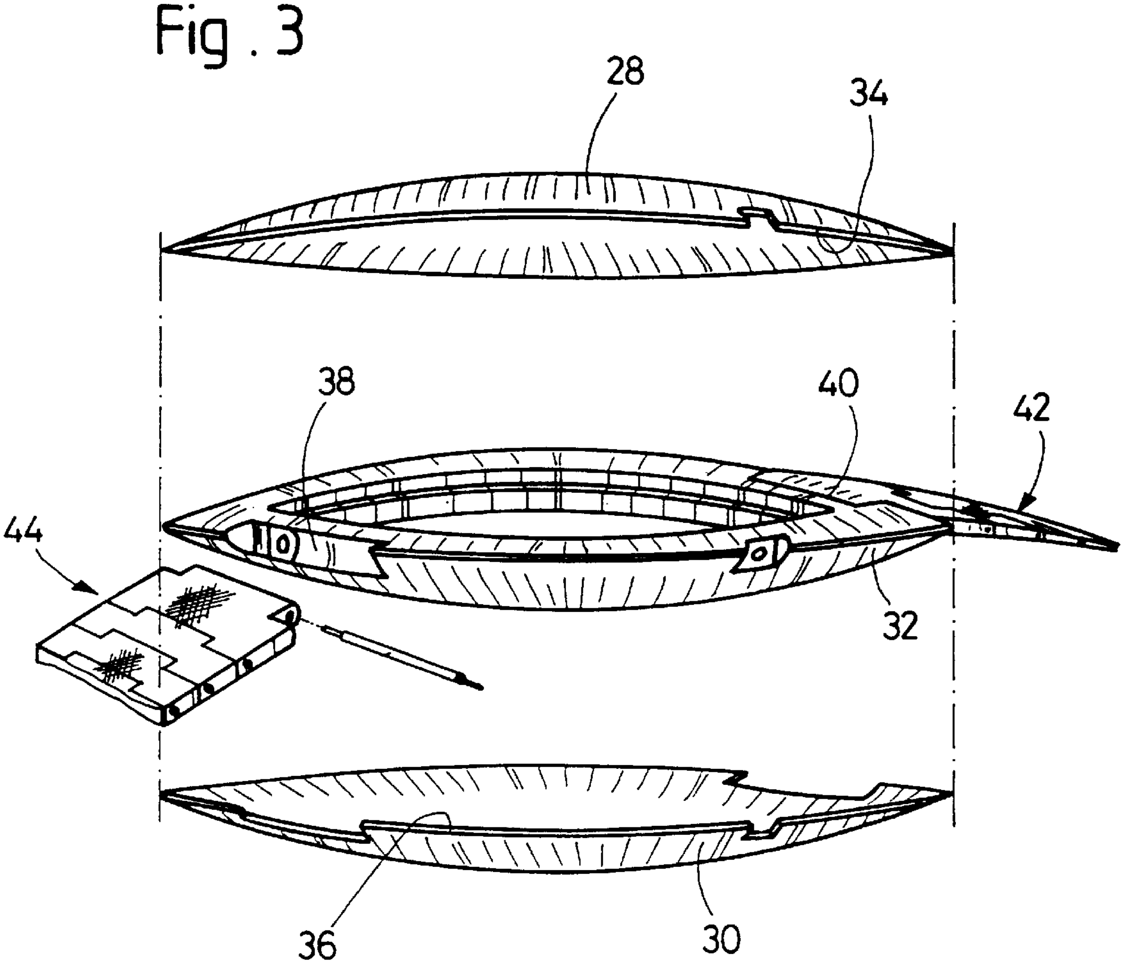
FIG. 3 shows an exploded perspective of a watch fitted with two scratchproof and transparent crystals according to the invention, in this case a crystal and a back cover.

Referring now to FIG. 3, another embodiment of a watch fitted with watch crystals according to the invention can be seen.

In this example, the watch case includes an upper shell 28 in the shape of a spherical cap, at least part of which is transparent and which forms a first watch crystal according to the invention.

The case also includes a lower shell 30, also in the shape of a spherical cap, and a middle part 32 arranged in the proximity of the periphery of shells 28 and 30, lower shell 30 forming a second watch crystal according to the invention. Crystals 28 and 30 thus have non flat shapes.

As is seen in FIG. 3, shells 28 and 30 define an inner space within which a movement is housed (not shown) and middle part 32 is arranged to fit respectively the shape of the lower and upper faces of upper shell 28 and lower shell 30 respectively to act as their support surface. Thus, when the case is assembled, edges 34 and 36 of the upper and lower shells are joined along their entire periphery with the exception of places 38 and 40 provided for attaching wristlet strands 42 and 44, and the middle part no longer appears.

Here upper shell 28, namely the crystal, and lower shell 30, namely the back cover, forming the scratchproof transparent crystals are made in the same way as the crystal described in connection with FIGS. 1 and 2. Since the edges of the shells are joined, the case thereby made is completely scratchproof. Moreover, as a result of the spherical cap shape of the crystals according to the invention—normally very expensive when they are made of synthetic sapphire—the case thereby obtained has very high shock absorption features since the shocks are transmitted to the seat of the shells which is situated on the middle part onto which they are fixed, thus benefiting from the arch effect.

It is to be understood that the two shells may include at the periphery of their internal face a masking layer such as a metallisation to hide certain elements of the case such as the middle part.

Although the present invention has been described in relation to particular embodiment examples, it is clear, however, that it is not limited to said examples and that it is capable of numerous alternatives and modifications without departing from its scope. For example the watch crystals could be used as transparent back covers for watch cases.

What is claimed is:

1. A transparent and scratchproof watch crystal made of polycrystalline diamond.

2. A watch crystal according to claim 1, wherein it has a non flat shape.

3. A watch crystal according to claim 1, wherein it is partially spherical.

4. A watch crystal according to claim 1, wherein it is partially cylindrical.

5. A watch crystal according to claim 1, wherein it has a thickness of between 0.5 and 2 mm.

6. A watch case including a middle part and a back cover, wherein it further includes at least one crystal according to claim 1.

7. A method of providing a watch crystal comprising: making the crystal of transparent polycrystalline diamond; and installing the crystal in a watch case.

8. A method according to claim 7, wherein the crystal has a thickness of between 0.5 and 2 mm.

9. The use of transparent polycrystalline diamond as a watch crystal having a thickness of between 0.5 and 2 mm.

* * * * *